United States Patent [19]

Shiraishi et al.

[11] Patent Number: 5,359,968
[45] Date of Patent: Nov. 1, 1994

[54] HYDROGEN GAS SUPPLY SYSTEM FOR HYDROGEN ENGINE

[75] Inventors: Noriaki Shiraishi; Yoshio Mizushima; Kenji Takamuku; Masaki Kadokura, all of Hiroshima, Japan

[73] Assignee: Mazda Motor Corporation, Hiroshima, Japan

[21] Appl. No.: 96,819

[22] Filed: Jul. 29, 1993

[30] Foreign Application Priority Data

Jul. 29, 1992 [JP] Japan .................. 4-202522

[51] Int. Cl.$^5$ .......................... F02B 43/08
[52] U.S. Cl. ................... 123/3; 123/DIG. 12
[58] Field of Search ........... 123/DIG. 12, 3, 575, 123/41.31

[56] References Cited

U.S. PATENT DOCUMENTS

| | | | |
|---|---|---|---|
| 4,214,699 | 7/1980 | Buchner et al. | 123/DIG. 12 |
| 4,253,428 | 3/1981 | Billings et al. | 123/DIG. 12 |
| 4,385,726 | 5/1983 | Bernauer et al. | 123/DIG. 12 |
| 4,570,446 | 2/1986 | Matsubara et al. | 123/DIG. 12 |
| 5,067,447 | 11/1991 | Iwaki et al. | 123/DIG. 12 |
| 5,082,048 | 1/1992 | Iwaki et al. | 123/DIG. 12 |
| 5,271,359 | 12/1993 | Teramoto et al. | 123/DIG. 12 |

FOREIGN PATENT DOCUMENTS

| | | | |
|---|---|---|---|
| 0252862 | 11/1986 | Japan | 123/DIG. 12 |
| 62-279264 | 12/1987 | Japan. | |
| 63-246458 | 10/1988 | Japan. | |
| 0037159 | 2/1990 | Japan | 123/DIG. 12 |

Primary Examiner—E. Rollins Cross
Assistant Examiner—Erick Solis
Attorney, Agent, or Firm—Keck, Mahin & Cate

[57] ABSTRACT

A hydrogen gas supply system, having metal hydride alloy tanks in which hydrogen at a specific pressure is released within a specified range of temperatures and supplied to a hydrogen engine, is accompanied by a coolant circulation system in which the engine and tanks are connected in parallel, for circulating a coolant through the engine and the tanks. The system executes temperature regulation of the coolant to the tank by mixing the coolant returning from the tanks with the coolant delivered from the engine when the coolant from the engine is at above the specified temperature range.

12 Claims, 8 Drawing Sheets

HYDROGEN GAS SUPPLY SYSTEM FOR HYDROGEN ENGINE

BACKGROUND OF THE INVENTION

1. Field of the Invention

The present invention relates to a hydrogen gas supply device for hydrogen engines.

2. Description of Related Art

The development of the hydrogen engine as a form of non-polluting engine system has been progressing in recent years. In order to supply hydrogen fuel to this type of engine, metal hydrides (which are hereafter referred to as metal hydride alloys), contained in tanks (which are hereafter referred to as metal hydride alloy tanks) which are mounted on vehicles, have been employed to occlude or storage and release hydrogen. Such hydrogen engine configurations or systems are known from, for example, Japanese Unexamined Patent Publications Nos. 62-279264 and 63-246458.

However, to effect release of occluded hydrogen in metal hydride alloy tanks at a specific predetermined pressure, i.e. the optimal release pressure, 4–10 atm., for example, for injection into the hydrogen engine, the metal hydride-alloy tanks must be maintained at a temperature corresponding to the optimal release pressure. To this end, in the hydrogen engine system described in Japanese Unexamined Patent Publication No. 63-246458, hot water is produced by heat exchange with exhaust gas from the hydrogen engine and circulated through the metal hydride alloy tanks as a heat medium.

On the other hand, coolant is conventionally circulated through an engine cylinder block to prevent the engine from being overheated. The coolant is generally heated to temperatures exceeding 90° C. in the course of this circulation. Accordingly, a configuration in which coolant is circulated as a heat medium through the metal hydride alloy tank permits a simpler overall design than the abovementioned configuration in which hot water is generated by the aid of exhaust gas.

In a system in which engine coolant is circulated through the metal hydride alloy tank as a heat medium, a metal hydride tank, which contains a metal hydride alloy which releases hydrogen at the optimal release pressure in the temperature range of, for example, 60°–90° C., is mounted on a vehicle.

During engine startup, even when coolant water of approximately the same temperature as ordinary temperature of atmospheric or ambient air, i.e, between 15° C. and 25° C., is circulated, release of hydrogen at the optimal release pressure is not achieved with the metal hydride alloy tank. Thus, an extra metal hydride alloy tank, which in turn is used for startup, has conventionally been mounted on the vehicle. That is, this extra metal hydride alloy tank (which is hereafter referred to as a startup tank for simplicity) contains a metal hydride alloy having temperature-pressure properties making it possible to achieve optimal release pressure at an ambient air temperature of approximately 10° C. The hydrogen engine is started with hydrogen generated in the startup metal hydride alloy tank. When the coolant exceeds, for example, approximately 60° C. due to subsequent warming, the supply of hydrogen to the hydrogen engine is switched over from the startup hydride alloy tank to the metal hydride alloy tank (which is hereafter referred to as the mobile tank for simplicity). After a wait to allow engine operation to stabilize after the switchover of tanks, vehicle drive is initiated.

However, in vehicles equipped with two types of metal hydride-alloy tanks for startup and running as described above, since the temperature of the coolant is raised by warming after hydrogen engine startup and the vehicle does not run until the switchover of tanks has been made to the mobile tank from the startup tank, starting reliability decreases. Moreover, hydrogen released by the startup tank during warming is not applied to running, lowering fuel efficiency with respect to actual mileage.

Although the startup metal hydride alloy described above could conceivably be stored in high-pressure containers capable of withstanding pressures of approximately 10 atm. and above, and hydrogen from these containers could be supplied to the hydrogen engine during running as well, drawbacks are encountered when mounting such high-pressure containers in vehicles in the form of various additional elements required to ensure safety, thus complicating the configuration and precluding weight reduction.

SUMMARY OF THE INVENTION

It is a primary object of the present invention to provide a hydrogen gas supply device for hydrogen engines that not only ensures reliable startup of the hydrogen engine and raises fuel efficiency, but permits the simplification of its own design and reduction in its own weight.

It is another object of the present invention to provide a hydrogen gas supply device for hydrogen engines that is capable of more stably supplying hydrogen to the hydrogen engine.

The foregoing objects of the present invention are achieved by providing a hydrogen gas supply system having tanks, each of which contains a hydride storage alloy and in each of which hydrogen at a pressure suitable for engine operation is released within a specified range of temperatures and supplied to a hydrogen engine. The hydrogen gas supply system cooperates with a looped coolant circulation system which connects the engine and tanks in parallel so as to circulate a coolant through them. This coolant circulation system is accompanied by a temperature regulation means, positioned therein in parallel with both engine and tank, which forces the coolant returning from the tanks to mix with the coolant delivered from the engine when the coolant from the engine is at above the specified range of temperatures so as to regulate the temperature of the coolant circulating through the tanks.

Specifically, the temperature regulation means comprises a bypass line and a regulation valve through which the coolant from the tanks flows to bypass the engine and enters the coolant from the engine. This regulation valve is intermittently controlled to open and closed such that the greater the temperature of the coolant from the engine is, the longer the period of the regulation valve remains open. Further, the hydrogen gas supply system is accompanied by a heat exchange means including a heat exchanger, such as a radiator positioned in parallel with both engine and tanks, through which the coolant circulating through the engine is forced to flow to the engine when the temperature of the coolant exceeds a predetermined temperature so as to cool the coolant from the engine by transfer of heat to the atmospheric air. When the coolant is forced to flow through the heat exchanger, it is also directed to the tanks in place of the coolant directly from the engine.

Since hydrogen released in the hydrogen storage alloy tanks is at the specific pressure (which is referred to as the optimal release pressure) required for engine operation and is within a specific temperature range close to ordinary temperatures, it can be used to start the hydrogen engine. Once the hydrogen engine is operating continuously, when the temperature of coolant circulated through the hydrogen storage alloy tanks exceeds the specific temperature range, a bypassing coolant from the hydrogen storage alloy tanks is mixed with the coolant directed from the engine toward the hydrogen storage alloy tanks. In other words, the temperature of the coolant having passed through the hydrogen storage alloy tanks drops before it reenters due to release of hydrogen which is accompanied by heat absorption. By suitably mixing the coolant from the tanks with the coolant from the engine, the coolant is always maintained within the specific range of temperatures when the it enters the hydrogen storage alloy tanks. In this manner, even when the temperature of coolant rises after the hydrogen engine has been started, the continuous release of hydrogen is achieved by maintaining the optimal release pressure in the hydrogen storage alloy tank.

Accordingly, as set forth above, since it is possible to supply hydrogen gas to the hydrogen engine from startup to drive using only a single type of hydrogen storage alloy tanks, improvements in startup reliability and fuel efficiency are realized over the conventional system with different two types of hydrogen storage alloy tanks, i.e. startup tanks and drive or mobile tanks, in which drive is engaged subsequent to warming after startup. Moreover, as set forth above, since the hydrogen storage alloy tanks do not have to be high pressure containers, weight reduction and simplification of the configuration of the system as a whole are possible.

By forcing a coolant to be circulated through a heat exchanger and thereafter through the engine and the hydrogen storage alloy tanks, overheated coolant is not supplied to the hydrogen storage alloy tanks, so that, even without a wide range of adjustment in the proportion of coolant supplied from the engine and mixed with the coolant from the hydrogen storage alloy tanks, it is realized to keep small the variation in temperature of coolant circulating the hydrogen storage alloy tanks. As a result, since it is possible to more accurately maintain the temperature of the coolant entering the hydrogen storage alloy tanks within the specified temperature range, it becomes possible to sustain the release of hydrogen under more stable conditions.

BRIEF DESCRIPTION OF THE DRAWINGS

The above and other objects and features of the present invention will be apparent to those skilled in the art from the following description of preferred embodiments when considered in conjunction with the drawings. In the drawings, the same reference numerals have been used to denote same or similar elements throughout.

DETAILED DESCRIPTION OF THE PREFERRED EMBODIMENTS

Figure 1:
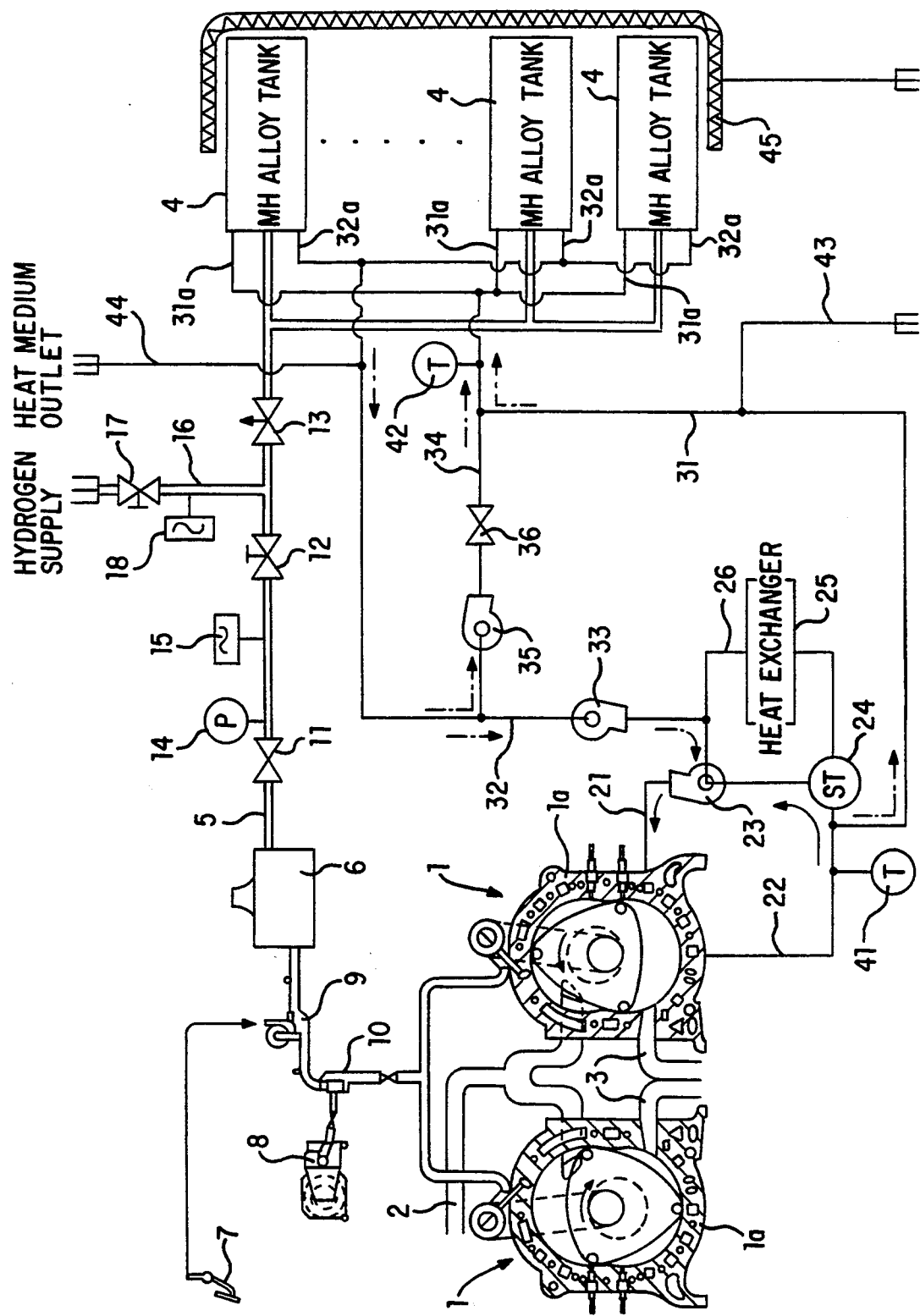
FIG. 1 is a schematic view of a hydrogen gas supply system in accordance with a preferred embodiment of the present invention.

Referring to the drawings in detail, in particular to FIG. 1, a hydrogen engine, such as a two cylinder rotary engine 1 provided with a hydrogen gas supply device in accordance with a preferred embodiment of the present invention is shown. In addition to an intake line 2 and exhaust lines 3, a hydrogen gas supply line 5, extending from a plurality of hydrogen storage alloy tanks or metal hydride alloy tanks 4 are connected to rotary engine 1. The hydrogen gas supply line 5 is provided with a pressure regulator 6. Further, hydrogen gas supply line 5 is provided with flow regulators 9 and 10 between pressure regulator 6 and engine 1, regulating the supply of hydrogen gas to hydrogen engine 1, which are linked to an accelerator pedal 7 and a step motor 8 which is driven by an engine control device (not shown), respectively. Between pressure regulator 6 and metal hydride alloy tanks 4, hydrogen gas supply line 5 is provided from the side of pressure regulator 6 with a hydrogen supply valve 11, a hydrogen gas main valve 12, and a relief valve 13. A pressure sensor 14 and a gas flowmeter 15 are connected to hydrogen gas supply line 5 between supply valve 11 and main valve 12. A hydrogen gas replenishment line 16 is also connected to hydrogen gas supply line 5 between main valve 12 and relief valve 13. A hydrogen gas replenishment valve 17 is installed in hydrogen gas replenishment line 16 and a replenishment gas flowmeter 18 is connected to hydrogen gas replenishment line 16. Main valve 12 and hydrogen gas replenishment valve 17 are both configured as manual cut-off valves.

Structural engine parts, including rotary housings 1a, 1a, of rotary engine 1 permit circulation of coolant water to be prevented from being overheating. To this end, a coolant delivery line 21 and a coolant return line 22 are connected to rotary engine 1. As indicated by solid arrows, coolant water driven by a coolant circulating pump 23 circulates in coolant delivery line 21 through rotary engine 1 to coolant return line 22. A thermostat 24 is positioned on coolant return line 22. A bypass line 26 provided with a heat exchanger 25, for example a radiator, is connected to coolant return line 22 between thermostat 24 and the inlet of coolant circulating pump 23. When the temperature of the coolant water exceeds the setting of thermostat 24, a passage from coolant return line 22 to bypass line 26 is opened within thermostat 24 and the coolant water flows through heat exchanger 25, resulting in cooling of the overheated coolant water by transfer of heat to the atmospheric air.

A heat medium delivery line 31 is connected to coolant return line 22 on the side of rotary engine 1 with respect to thermostat 24 so as to accept a portion of the flow of circulating coolant water from coolant return line 22 and supply it as heat medium to each of metal hydride alloy tanks 4. The forward end of heat medium delivery line 31 forks into a number of branch delivery lines 31a which are connected to metal hydride alloy tanks 4, respectively. Additionally, a heat medium return line 32 is connected to bypass line 26 between coolant circulating pump 23 and heat exchanger 25. The forward end of heat medium return line 32 forks into a number of branch return lines 32a which are connected to metal hydride alloy tanks 4, respectively. Circulation line of a circulation system comprises heat medium delivery line 31 and heat medium return line 32, providing circulation through metal hydride alloy tanks 4. Through the action of heat medium circulating pump (Pc) 33 positioned on heat medium return line 32, a portion of the coolant water circulating through rotary hydrogen engine 1 is supplied from coolant return line 22 through heat medium delivery line 31 and branch delivery lines 31a to each of metal hydride alloy tanks 4, and subsequently returned through branch return lines 32a, heat medium return line 32, and bypass line 26 to coolant delivery line 21, as indicated by broken arrows.

A heat medium bypass line 34 is positioned between and connects heat medium delivery line 31 and heat medium return line 32. A bypass pump (Pb) 35 and a bypass valve (Vb) 36 are positioned on heat medium bypass line 34 as a means of temperature regulation. When bypass valve (Vb) 36 is opened and bypass pump (Pb) 35 is actuated, a portion of the coolant water circulating through heat medium return line 32 to bypass line 26, as indicated by dot-dash-dot arrows, is diverted through heat medium bypass line 34 to heat medium delivery line 31. Thus, this diverted coolant water is mixed with coolant water supplied by coolant return line 22 in the forward end of heat medium delivery line 31, and the mixed coolant water enters each of the metal hydride alloy tanks 4. Further, a temperature sensor 41, which detects the temperature Tw of coolant water flowing through coolant return line 22, is connected near the connecting point of coolant return line 22 and heat medium delivery line 31. A temperature sensor 42, which detects as the entering heat medium temperature Ti the temperature of coolant water flowing into metal hydride alloy tanks 4, is connected to the forward end of heat medium delivery line 31.

A heater 45 is wound around metal hydride alloy tanks 4. As will be described later, when the external air temperature is low during startup, electricity is supplied to heater 45 by an external power source, such as a battery, to heat metal hydride alloy tanks 4 so as to cause hydrogen gas to be released. A low-temperature heat medium supply line 43 and a low-temperature heat medium discharge line 44 are connected to heat medium delivery line 31 and heat medium return line 32, respectively, so as to circulate low temperature heat medium to metal hydride alloy tanks 4 from the exterior during the occlusion occurring when hydrogen gas is supplied to metal hydride alloy tanks 4 from the exterior.

Figure 2:
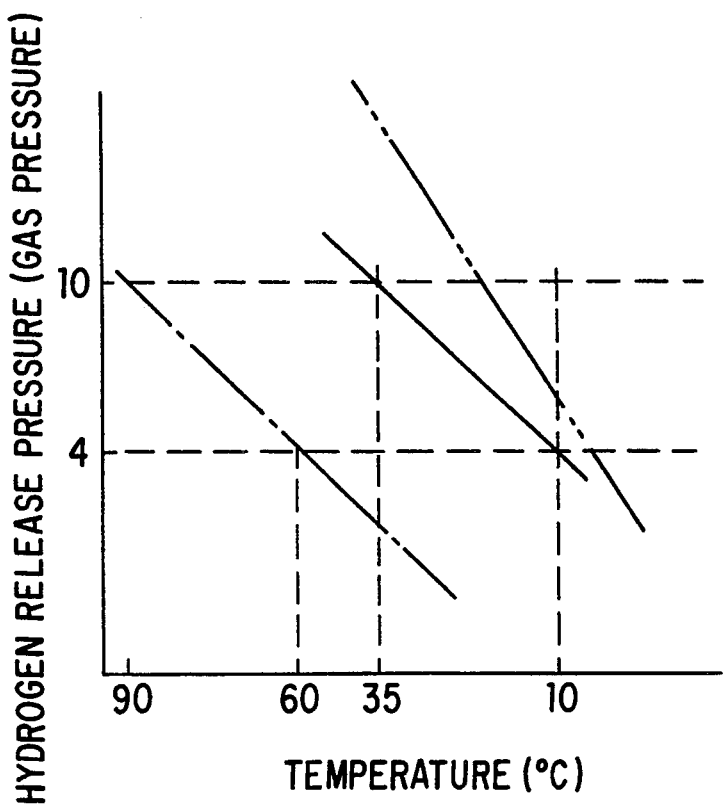
FIG. 2 is a graph showing the temperature-release pressure characteristics of a metal hydride alloy in the metal hydride alloy tanks.

A metal hydride alloy, which has the temperature-release pressure characteristics shown by the solid line in FIG. 2, is stored in each of the metal hydride alloy tanks 4. In other words, hydrogen is released to hydrogen engine 1 at about 10° C. at the minimum optimal release pressures of, for instance, 4 atm. Then, when the release pressure increases with a rise in temperature to about 35° C., hydrogen is released at the maximum optimal release pressure of, for instance, 10 atm. Accordingly, it is necessary to maintain metal hydride alloy tanks 4 within a temperature range of 10°–35° C. to ensure continuous operation of hydrogen engine 1 on hydrogen gas released by metal hydride alloys contained in metal hydride alloy tanks 4. To this end, the circulation of coolant water to metal hydride alloy tanks 4 is controlled by a control device (not shown) based on the temperatures detected by coolant temperature sensor 41 and heat medium inlet temperature sensor 42.

A specific example of the circulation control in the hydrogen engine system of this type mounted in a vehicle will be hereafter described. It is noted that the temperature of coolant water is generally approximately identical to an external temperature when hydrogen engine 1 is not started, and may rise to levels exceeding, for example, 90° C. during continuous operation of hydrogen engine 1. During startup, main valve 12 is manually opened and, then, when the ignition key (IG) is switched on, coolant circulating pump 23 and heat medium circulating pump (Pc) 33 start up, the circulation of coolant water to hydrogen engine 1 is initiated, with a portion of the coolant water beginning to circulate to metal hydride alloy tanks 4. Simultaneously, hydrogen supply valve 11 is opened. At this time, hydrogen engine 1 is started as soon as a stable pressure of greater than 4 atm. is detected by pressure sensor 14, which may require, for example, 5 seconds. In this instance, if, because the external air temperature is less than 10° C. and accordingly, the temperature of metal hydride alloy tanks 4 is low, the pressure detected by pressure sensor 14 is less than 4 atm., a low-temperature indicator (see FIG. 3) provided on the instrument panel in the vehicle compartment lights up. At this time, electricity is provided to heater 45 to heat metal hydride alloy tanks 4. From then on, heater 45 is continuously controlled by switching on and off its electrical power source based on the pressure detected by pressure sensor 14. The temperature in metal hydride alloy tanks 4 is raised by supplying heater 45 with electric power and, when the release pressure of hydrogen gas reaches 4 atm., hydrogen engine 1 is started in the above-described manner.

Once hydrogen engine 1 has started, heat medium circulating pump (Pc) 33 remains on until the temperature of the coolant water, circulating through hydrogen engine 1, has reached 35° C. A portion of the coolant water flowing through coolant return line 22 is diverted to heat medium delivery line 31, from which it passes through branch delivery lines 31e, flowing into each of metal hydride alloy tanks 4. It, then, circulates from branch return lines 32a through heat medium return line 32, returning to hydrogen engine 1.

As a result of a rise in the temperature of the coolant water due to continuous operation of hydrogen engine 1, when a coolant temperature Tw exceeding 35° C. is detected, bypass pump (Pb) 35 is actuated or switches on, and bypass valve (Vb) 36 is opened, so that the coolant water, flowing from metal hydride alloy tanks 4 to hydrogen engine 1 through heat medium return line 32, is bypassed through heat medium bypass 34. This causes the bypassed coolant water and the coolant water supplied from hydrogen engine 1 to mix with each other, entering metal hydride alloy tanks 4.

Since hydrogen is released in metal hydride alloy tanks 4 by endothermic reaction, the coolant water passing through metal hydride alloy tanks 4 decreases its temperature to, for example, approximately 15° C.

from the temperature when it enters into metal hydride alloy tanks 4. By appropriately mixing the coolant water that has been thus cooled with a high temperature of heat medium supplied from hydrogen engine 1, the temperature of the coolant water can be held below 35° C. when entering metal hydride alloy tanks 4. The mixture ratio of coolant water can be adjusted by intermittently actuating bypass pump (Pb) 35 and opening bypass valve (Vb) 36. In this intermittent control, the greater the temperature of coolant water supplied by hydrogen engine 1 is, the longer the period of bypass pump (Pb) 35 remains actuated and the longer bypass valve (Vb) 36 remains open.

In this manner, coolant used to cool hydrogen engine 1 is exploited as a heat medium to transport heat required for the release of hydrogen in metal hydride alloy tanks 4. With this control, the temperature of metal hydride alloy tanks 4 can be maintained within the specified range of 10°–35° C. over nearly the entire temperature range of the coolant as it heats up due to operation of hydrogen engine 1. Accordingly, in contrast to conventional hydrogen gas supply devices equipped with two types of metal hydride alloy tanks, such as a startup tank and a mobile tank, in which warming is performed subsequent to starting up of hydrogen engine 1 using hydrogen from the startup tank, and then, drive is initiated by switching over to the mobile tank, the gas supply device according to the present invention is enabled to stably supply hydrogen gas to hydrogen engine 1 from startup to drive by the provision of only one type of metal hydride tanks 4, which are approximately identical with a startup tank, so as to obviate the need for warming of hydrogen engine 1 and permit drive immediately after the startup of hydrogen engine 1. This raises the reliability of startup and improves fuel efficiency of hydrogen engine 1. Moreover, since there is no need to use high-pressure containers for metal hydride alloy tanks 4, simplification and weight reduction of the configuration of a hydrogen engine system as a whole are possible.

Control modes of the hydrogen engine system at times other than startup and drive are as follows:

(1) When stopped, turning the ignition key off opens all of the valves and stops all of the pumps.

(2) While the vehicle is not operated, all of the valves are kept open and all of the pumps are maintained stopped since the ignition key remains turned off.

(3) During emergencies, such as when drive becomes unstable due to abnormal combustion in hydrogen engine 1 and when backfiring occurs, an emergency switch is thrown off by the operator to shut down the supply of hydrogen into hydrogen engine 1 so as to close hydrogen supply valve 11 even with the ignition key on and thereafter, close all other valves and stop all of the pumps.

(4) When hydrogen leakage is detected by a hydrogen sensor, a warning light lights up on the instrument panel and a buzzer simultaneously sounds to give a warning.

(5) In collisions, when pressure sensor 14 detects a sudden pressure drop, all of the valves are closed and all of the pumps are stopped.

When filling metal hydride alloy tanks 4 with hydrogen, after the ignition key has been switched off, an external hose used for hydrogen replenishment is connected to hydrogen gas replenishment line 16, and water supply and discharge hoses are connected to low-temperature heat medium supply line 43 and low-temperature heat medium discharge line 44, respectively. While the low-temperature heat medium is being supplied to metal hydride alloy tanks 4, hydrogen is supplied to metal hydride alloy tanks 4 through hydrogen gas replenishment line 16. At this time, the value, which is a result of subtraction of the value measured by supply gas flowmeter 15 from the value measured by gas flowmeter 18 connected to hydrogen gas replenishment line 16, is displayed as the quantity of fuel in metal hydride alloy tanks 4 by the fuel indicator (not shown) on the instrument panel in the vehicle compartment.

Figure 3:
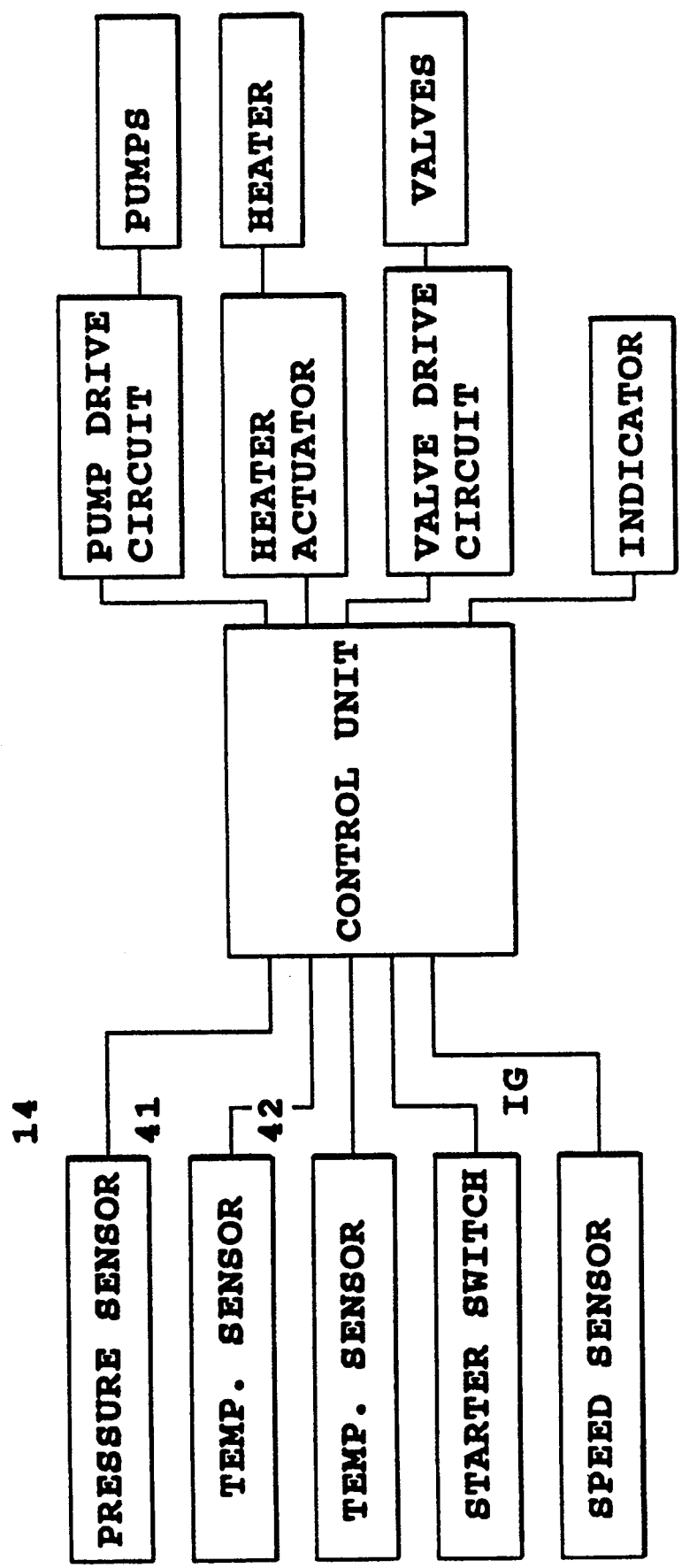
FIG. 3 is a block diagram showing how a control unit controls the hydrogen gas supply system.

As shown in FIG. 3, the hydrogen gas supply system is controlled by a control unit 100 to which various signals representative of pressure, temperatures, engine speed, etc are input and which provides control signals to pump and valve drive circuits 101 and 102.

Figure 4A:
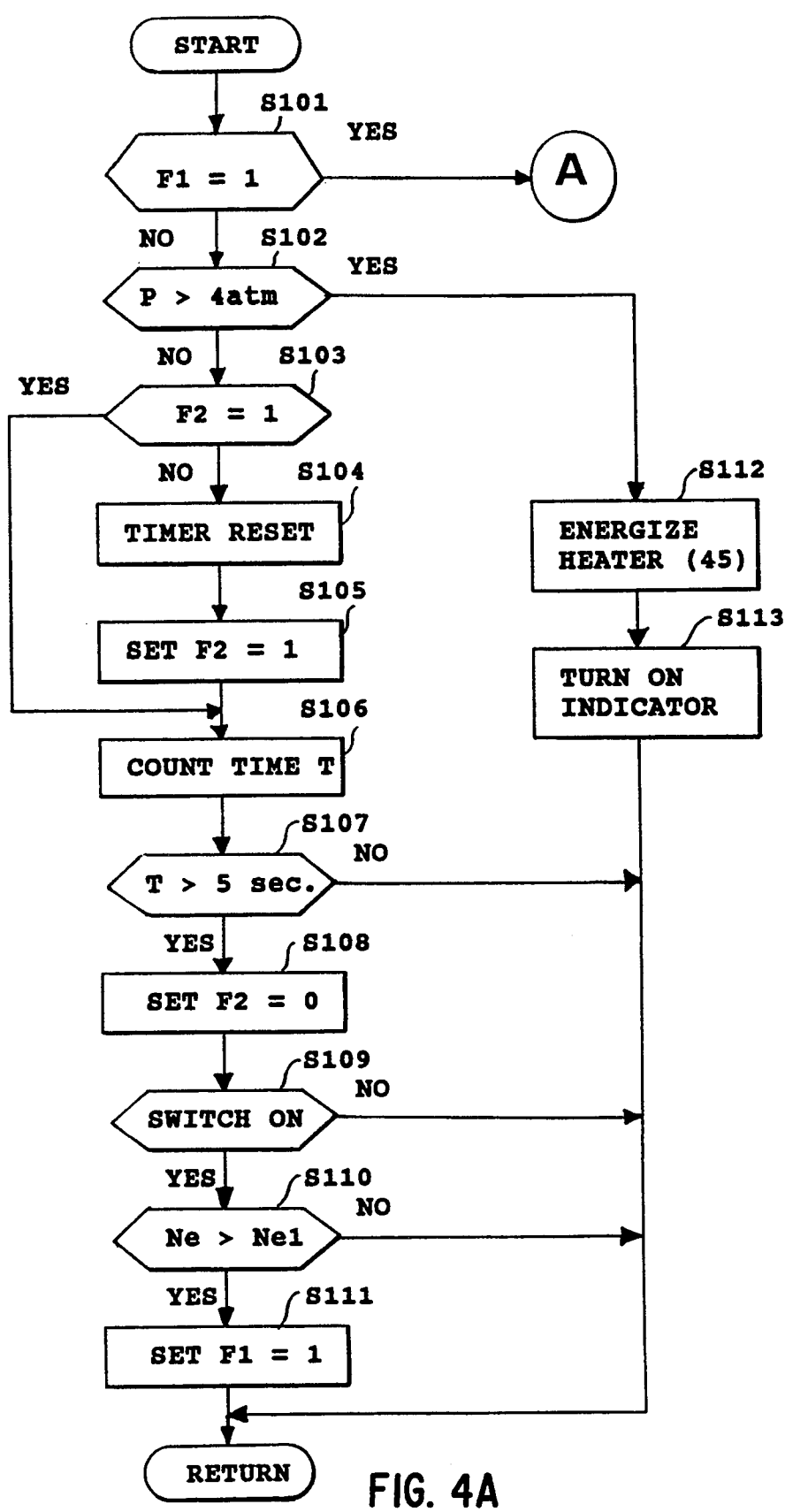
FIGS. 4A and 4B are a flow chart illustrating a control sequence for the system shown in FIG. 1.
Figure 4B:
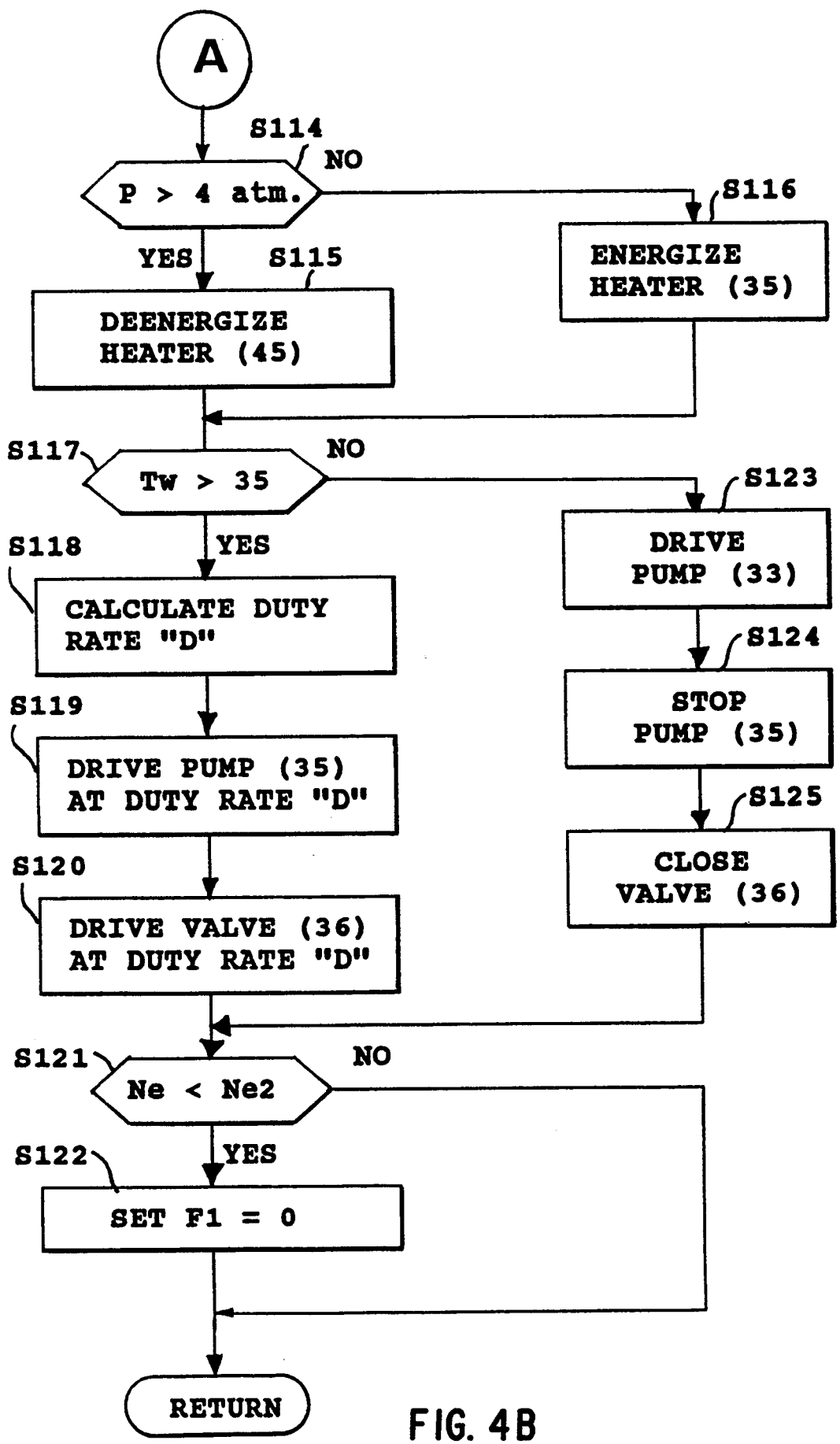

Referring to FIG. 4, which is a flow chart illustrating a control sequence, just after starting of the sequence for the hydrogen gas supply system shown in FIG. 1, a decision is made at step S101 as to whether a flag F1 has been set to "1." If the answer is "YES," a decision is made at step S102 as to whether a release pressure is higher than the minimum optimal release pressures of 4 atm. If "YES," another decision is made at step S103 as to whether a flag F2 has been set to "1." After setting the flag F2 to "1" at step S105 subsequent to having reset a timer at step S104 if the flag F2 has not been set to "1," or directly if the flag has been set to "1," the timer starts to count a time T at step S106. Then, a decision is made at step S107 as to whether five seconds have passed. If the answer to the decision is "YES," then, the flag F2 is set to "0" at step S108. Subsequently, at step S109, a decision is made as to whether the ignition switch (IG) has been turned on. When ignition switch (IG) has been turned on, then, a decision is made based on a speed detected by the speed sensor (see FIG. 3) at step S110 as to whether the rotational speed Ne of the engine 1 is higher than a first specific rotational speed Ne1 which is a critical speed to judge whether the engine has actually started. If the answer is "YES," then, after setting the flag F1 to "1" S111 the sequence returns.

On the other hand, if the answer to the decision made at step S102 is "NO," then, the heater energizing circuit is actuated to energize the heater 45 at step S112. Thereafter, after turning on the indicator, such as a lamp, at step S113, the sequence returns. When the answer to any decisions made at steps S107, S109 and S110 is "NO," the sequence returns.

After starting of the sequence, if the answer to the decision made at step S101 is "YES," then, a decision is made at step S114 as to whether a release pressure is higher than the minimum optimal release pressures of 4 atm. As a result of the decision, the heater 45 is deenergized at step S115 when the answer is "YES," or is energized at step S116 when the answer is "NO." Thereafter, a decision is made at step S117 as to whether the temperature Tw of coolant water flowing through coolant return line 22 detected by the temperature sensor 41 is higher than 35° C. When a temperature higher than 35° C. is detected, a duty rate D, at which the pump 35 and the valve 36 are operated, is calculated at step S118. According to the calculated duty ratio, the pump 35 and the valve 36 are operated at step S119 nd S120, respectively. On the other hand, if the answer to the decision made at step S117 is "NO," then, after driving the pump 33 at step S 123 and stopping the pump 35 at step S124, the valve 36 is closed. Thereafter, a decision is made at step S121 as to whether the rotational speed Ne of the engine 1 is higher than a second specific rotational speed Ne2 which is a critical speed to judge whether the engine possibly stops. After setting the flag F2 to "0" at step S122 If the answer is "YES," or otherwise directly if the answer is "NO," the sequence returns.

Figure 6:
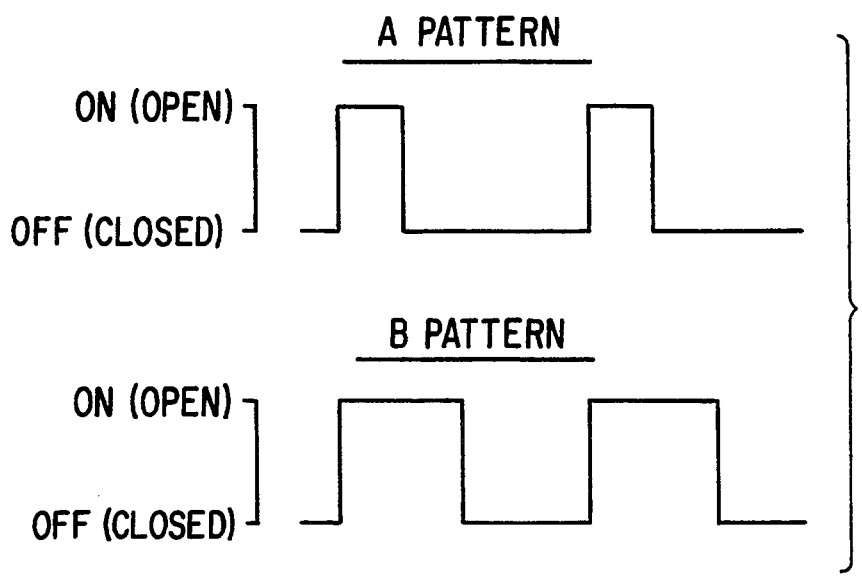
FIG. 6 is a diagram of control patterns having different ratios of open/engaged time to closed/stopped time.
Figure 5:
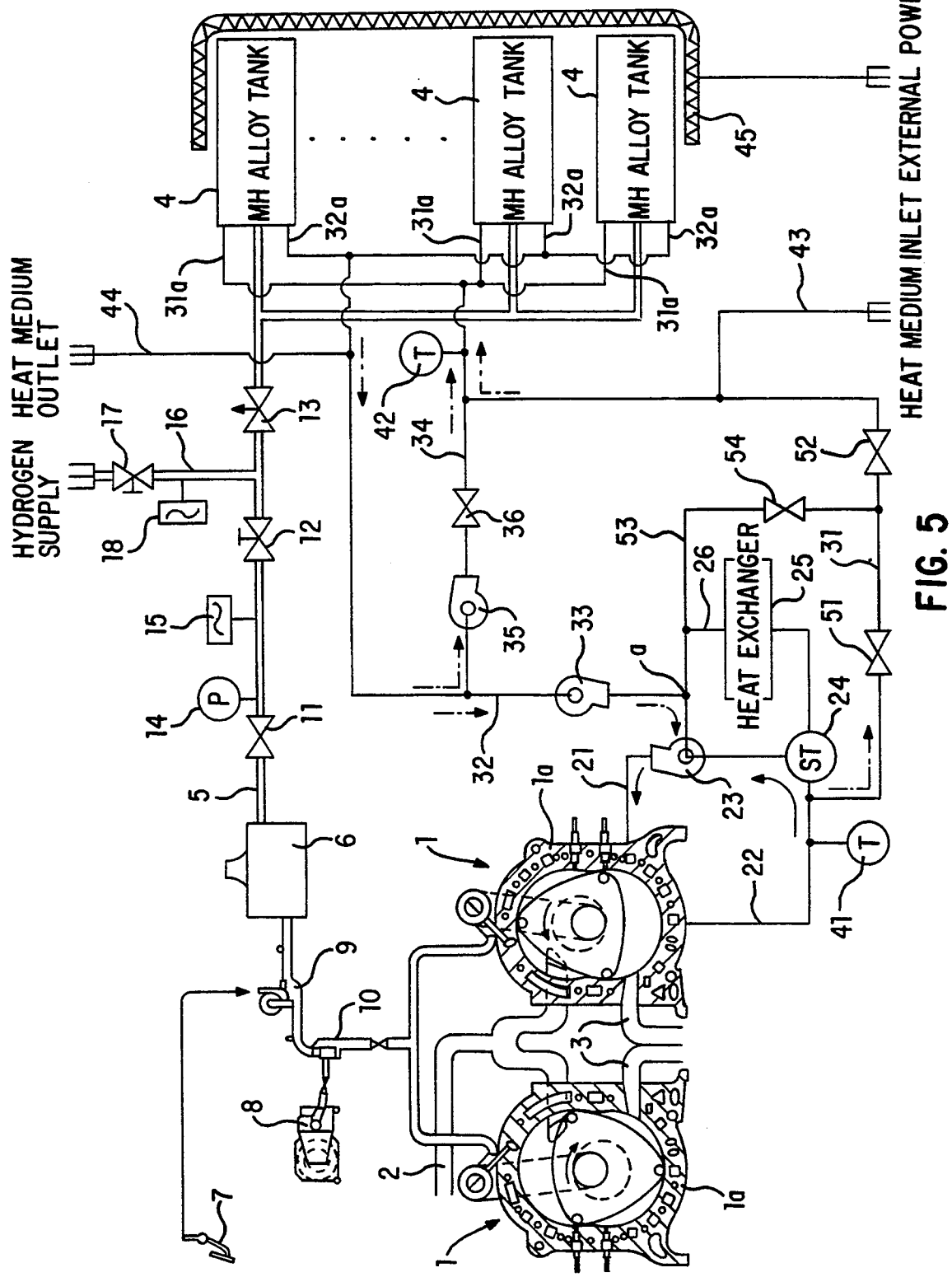
FIG. 5 is a schematic view of a hydrogen gas supply system in accordance with another preferred embodiment of the present invention.

Referring to FIGS. 5 and 6, showing a hydrogen engine, such as a two cylinder rotary engine 1, provided with a hydrogen gas supply device in accordance with another preferred embodiment of the present invention, in which, for the sake of convenience, parts having functions identical to parts shown in the previous embodiment are labeled identically, in addition to the configuration shown in FIG. 1, a first bypass valve (V1) 51 and a heat medium main valve (Vm) 52 are positioned in a heat medium delivery line 31 in order from the end of coolant return line 22. In this configuration, the portion of heat medium delivery line 31 between first bypass valve (V1) 51 and source valve (Vm) 52 is connected to the portion of bypass line 26 between its point of connection with heat medium return line 32 and heat exchanger 25 by a directional control line 53 on which is positioned a second bypass valve (V2) 54.

In the supply device thus configured, it is possible to more accurately regulate the temperature of coolant water entering metal hydride alloy tanks 4 within the temperature range from 10° to 35° C. A description of an example of this temperature regulation or control is given with reference to Table I in which "A" and "B" indicate A-control pattern and B-control pattern, respectively.

Control mode II is a control that is initiated when supplying electric power to heater 45 during startup is not necessary, or when heat medium inlet temperature Ti is detected to have exceeded the predetermined critical temperature of 15° C. while control mode I is still in effect. A coolant temperature Tw of 35° C. or less and a heat medium inlet temperature Ti of between 10°–35° C. are preconditions for this control. From the control mode I, second bypass valve (V2) 54 is closed and first bypass valve (V1) 51 is opened to direct the coolant water that has been warmed several degrees in temperature by passing through hydrogen engine 1 through heat medium delivery line 31 to metal hydride alloy tanks 4. This coolant water circulates through metal hydride alloy tanks 4 in a manner that maintains the temperature there at 10°–35° C.

If coolant temperature Tw exceeds 35° C. during continued operation, either control mode III or IV is engaged. In control modes III and IV, in addition to first bypass valve (V1) 51 and main valve (Vm) 52 being opened to direct coolant water to metal hydride alloy tanks 4, bypass valve (Vb) 36 is opened and bypass pump (Pb) 35 is started to divert the coolant water from heat medium return line 32 through heat medium bypass line 34 to mix it with coolant water supplied from the engine side, the mixture then entering metal hydride alloy tanks 4. During this time, first bypass valve (V1) 51 and heat medium main valve (Vm) 52 are intermittently turned on and off and heat medium circulating pump (Pc) 33 is intermittently started and stopped. However, in order to vary the duty ratio of OFF (closed or stopped) time to ON (open or engaged) time,

TABLE I

| Control Mode | Temperature Tw | Ti | Valve (52) | Valve (51) | Valve (54) | Pump (33) | Valve (36) | Pump (35) |
|---|---|---|---|---|---|---|---|---|
| I | — | 15 | Open | Close | Open | ON | Close | OFF |
| II | 35 | 10–30 | Open | Open | Close | ON | Close | OFF |
| III | 35–90 | 20–30 | Open-A | Open-A | Close | ON-A | Open | ON |
| IV | 35–90 | 10–20 | Open-B | Open-B | Close | ON-B | Open | ON |
| V | 90 | 20–30 | Open-A | Close | Open-A | ON-A | Open | ON |
| VI | 90 | 10–20 | Open-B | Close | Open-B | ON-B | Open | ON |
| VII | — | 30 | Close | Close | Close | OFF | Open | ON |

As shown in Table I, the switching and cut-off control operations shown in control modes I–VII are executed based on the coolant temperature Tw detected by coolant temperature sensor 41 and the heat medium inlet temperature Ti detected by heat medium inlet temperature sensor 42. Control mode I is a control that supplies electricity to heater 45 to heat metal hydride alloy tanks 4 during startup. During such startups, heat medium main valve (Vm) 52 and second bypass valve (V2) 54 remain open and heat medium circulating pump (Pc) 33 operates until heat medium inlet temperature Ti reaches a predetermined critical temperature of, for example, 15° C. Thus, coolant spewed forth by heat medium circulating pump (Pc) 33 circulates through the closed loop comprising directional control line 53, heat medium delivery line 31, metal hydride alloy tanks 4, and heat medium return line 32. Coolant water from coolant circulating pump 23 circulates through a substantially independent loop on the engine side comprising coolant delivery line 21, hydrogen engine 1, and coolant return line 22. Accordingly, the low-temperature coolant water on the engine side hardly enters on the side of metal hydride alloy tank 4 at all. Thus, heating of metal hydride alloy tanks 4 by heater 45 proceeds rapidly.

the duty ratio of the two coolants in the mixture is adjusted. In order to effect this adjustment, for example, as shown in FIG. 6, two control patterns having different duty ratios of open/engaged time to closed/stopped time, i.e, a control pattern A and a control pattern B, are predetermined.

As indicated in control mode III, when heat medium inlet temperature Ti is within the range of 20°–30° C., first bypass valve (V1) 51 and heat medium main valve (Vm) 52 are opened and closed and heat medium circulating pump (Pc) 33 is started and stopped according to pattern A. As indicated in control mode IV, when heat medium inlet temperature Ti is within the range of 10°–20° C., first bypass valve (V1) 51 and heat medium main valve (Vm) 52 are opened and closed and heat medium circulating pump (Pc) 33 is started and stopped according to pattern B, in which the open/engaged time is longer than in pattern A. Thus, when heat medium inlet temperature Ti is high, the proportion of heated coolant water in the mixture is smaller to control the rise in heat medium inlet temperature Ti, and when heat medium inlet temperature Ti is low, the proportion of heated coolant water in the mixture is increased to control the drop in heat medium inlet temperature Ti. As a result, heat medium inlet temperature Ti is stably maintained within the range of 10°–30° C. Further, when coolant temperature Tw increases to above a predetermined critical temperature of, for example, 90° C., control mode V or VI is engaged. In these modes, from the state of control mode III or control mode IV, first bypass valve (V1) 51 is closed and second bypass valve (V2) 54 is opened. At this time, the route of coolant water circulating through the side of hydrogen engine 1 is altered to run through thermostat 24 along coolant return line 22 to heat exchanger 25 positioned on bypass line 26. Even a coolant temperature Tw exceeds 90° C., it decreases to, for example, about 60° C. after having passed through heat exchange 25 due to transfer of heat to the outside air. A portion of this coolant water is directed through directional control line 53 and heat medium delivery line 31 to metal hydride alloy tanks 4. Even in such cases, heat medium inlet temperature Ti is stably maintained within the range of 10°–30° C. This is accomplished when the heat medium inlet temperature Ti is between 20°–30° C. by control mode V, in which opening and closing of second bypass valve (V2) 54 and heat medium supply source valve (Vm) 52 and starting and stopping of heat medium circulating pump (Pc) 33 are executed according to the control pattern A, and when the heat medium inlet temperature Ti is between 10°–20° C., by control mode VI, in which heat exchanger 25, second bypass valve (V2) 54, and heat medium circulating pump (Pc) 33 are controlled according to the control pattern B.

When heat medium inlet temperature Ti exceeds 30° C., as indicated by control mode VII, first bypass valve (V1) 51, heat medium main valve (Vm) 52, and second bypass valve (V2) 54 are all closed, and heat medium circulating pump (Pc) 33 is stopped, so that no coolant is supplied from the side of hydrogen engine 1. Further, bypass valve (Vb) 36 is opened, and bypass pump (Pb) 35 is started, so as to circulate the coolant water only through heat medium bypass line 34 to metal hydride alloy tanks 4. By executing controls such as the control modes set forth above, the coolant water with a temperature adjusted to 10°–30° C. is circulated to metal hydride alloy tanks 4 even during drive. From startup to drive, hydrogen gas is released from metal hydride alloy tanks 4 within a pressure range of 4–10 atm., permitting stable, uninterrupted drive.

In this embodiment, thermostat 24 functions in the coolant circulation loop on the side of hydrogen engine 1. When the loop is altered, coolant water is sent to metal hydride alloy tanks 4 after having passed through heat exchanger 25. Accordingly, since coolant water overheated on the side of hydrogen engine 1 is not directed to metal hydride alloy tanks 4, even though the adjustment range of the mixture ratio of coolant water supplied from the side of hydrogen engine 1 to bypass coolant water is not substantially large, by switching between, for example, two control patterns such as the control patterns A and B, the temperature of coolant entering the hydrogen storage alloy tanks 4 can be reliably maintained within the range of 10°–30° C. As a result, the release of hydrogen can be sustained under more stable conditions, and reliable drive can be assured.

Figure 7A:
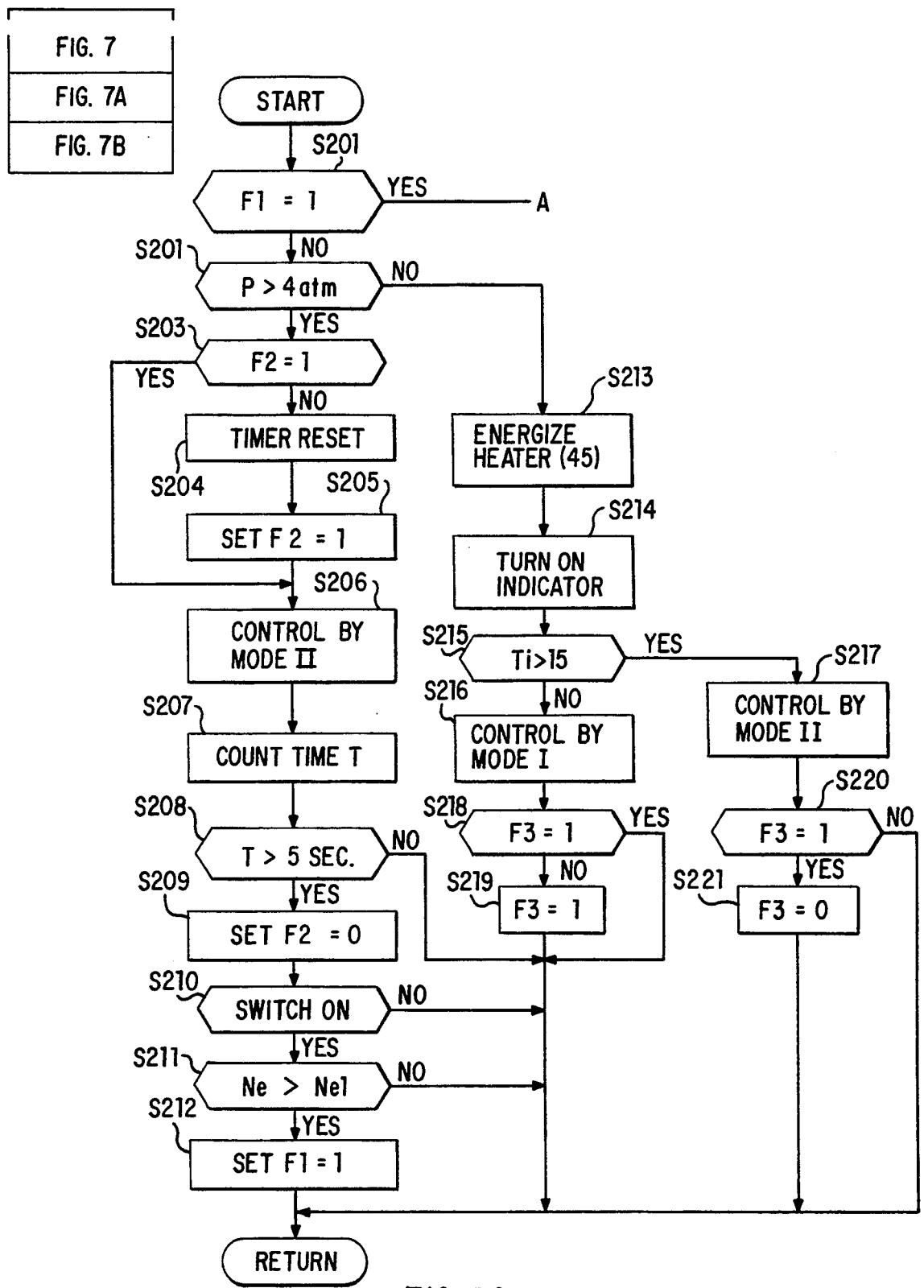
FIGS. 7A and 7B are a flow chart illustrating a control sequence for the hydrogen gas supply system shown in FIG. 5.
Figure 7B:
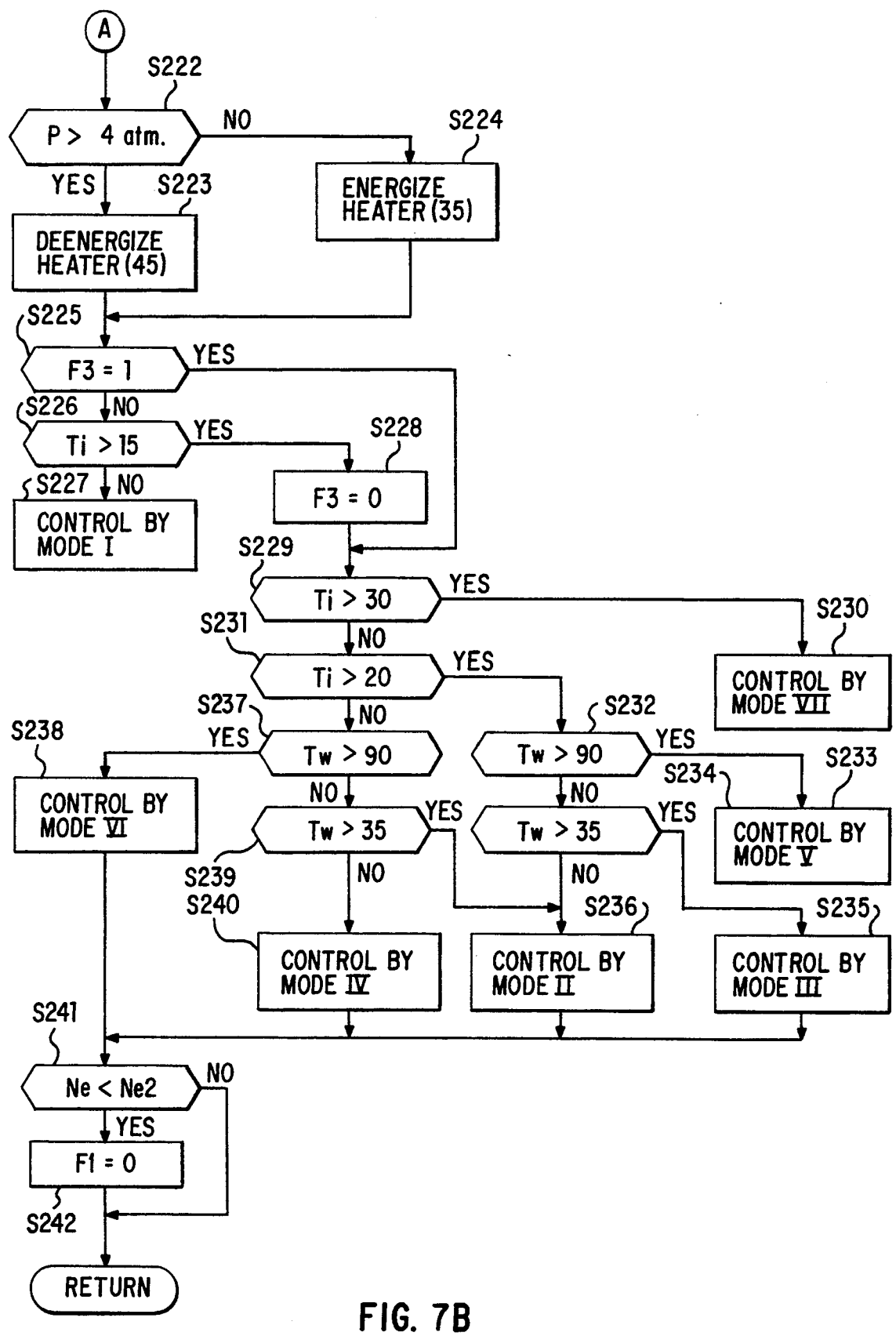

Referring to FIG. 7, which is a flow chart illustrating a control sequence for the hydrogen gas supply system shown in FIG. 5, after starting of the sequence, the first step at step S201 is to make a decision as to whether a flag F1 has been set to "1." If the flag F1 has not been set to "1," then, a decision is made at step S202 as to whether a release pressure is higher than the minimum optimal release pressures of 4 atm. If "YES," another decision is made at step S203 as to whether a flag F2 has been set to "1." After setting the flag F2 to "1" at step S205 subsequent to having reset a timer at step S204 if the flag F2 has not been set to "1," or otherwise directly if the flag F2 has been set to "1," then, control is conducted in the control mode II at step S206. The timer starts to count a time T at step S207. Then, a decision is made at step S208 as to whether five seconds have passed. If the answer to the decision is "YES," then, the flag F2 is set to "0" at step S209. Subsequently, at step S210, a decision is made as to whether the ignition switch (IG) has been turned on. When ignition switch (IG) has been turned on, then, a decision is made based on a speed detected by the speed sensor at step S211 as to whether the rotational speed Ne of the engine 1 is higher than a first specific rotational speed Ne1. If the answer is "YES," then, after setting the flag F1 to "1" at step S212, the sequence returns.

On the other hand, if the answer to the decision made at step S202 is "NO," then, the heater energizing circuit is actuated to energize the heater 45 at step S213. Thereafter, after turning on the indicator, such as a lamp, at step S214, a decision is made at step S215 as to whether the heat medium inlet temperature Ti detected by temperature sensor 42 is higher than 15° C. According to the result of the decision, a control is conducted in the control mode I at step S216 if the answer is "NO," and in the control mode II at step S217 if the answer is "YES." Thereafter, a decision is made at step S218 or S220 as to whether a flag F3 has been set to "1." If the flag F3 has been set to "1" at step S218, the sequence returns. Otherwise, if the flag F3 has been set to "1" at step S218, then, after setting the flag F3 to "1" at step S219, the sequence returns. Similarly, if the flag F3 has not been set to "1" at step S220, the sequence returns. Otherwise, if the flag F3 has been set to "1" at step S220, then, after setting the flag F3 to "0" at step S221, the sequence returns.

After starting of the sequence, if the answer to the decision made at step S201 is "YES," then, a decision is made at step S222 as to whether a release; pressure is higher than the minimum optimal release pressures of 4 atm. As a result of the decision, the heater 45 is deenergized at step S223 when the answer is "YES," or is energized at step S224 when the answer is "NO." Thereafter, a decision is made at step S225 as to whether the flag F3 has been set to "1." If the answer is "YES," another decision is made at step S226 as to whether the temperature Ti of coolant water at the heat medium inlet detected by the temperature sensor 42 is higher than 15° C. When a temperature higher than 15° C. is not detected, a control is conducted in the control mode I at step S227. On the other hand, when a temperature higher than 15° C. is not detected, the flag F3 is set to "0" at step S228

When the flag F3 has not been set to "1" at step S225 or after setting the flag F3 to "0," decisions regarding coolant temperature are subsequently made. That is, a decision is made at step S229 as to whether the coolant inlet temperature Ti is higher than 30° C. If the coolant inlet temperature Ti is higher than 30° C., then, a control is conducted in the control mode VII at step S230. Otherwise, if the coolant inlet temperature Ti is less than 30° C., a decision is further made at step S231 as to whether the coolant inlet temperature Ti is higher than 20° C. If the coolant inlet temperature Ti is less than 20°

C., then, a decision is made at step S232 as to whether the coolant return temperature Tw detected by temperature sensor 41 is higher than 90° C. If the answer to the decision is "YES," then, a control is conducted in the control mode V at step S233. However, if the coolant return temperature Tw is less than 90° C., then, a further decision is made at step S234 as to whether the coolant return temperature Tw detected by temperature sensor 41 is higher than 35° C. According to the decision, a control is conducted in the control mode III at step S235 if the coolant return temperature Tw is higher than 35° C. or in the control mode II at step S236 if less than 35° C.

Similarly, if the coolant inlet temperature Ti is higher than 20° C., a decision is made at step S237 as to whether the coolant return temperature Tw detected by temperature sensor 41 is higher than 90° C. If the answer to the decision is "YES," then, a control is conducted in the control mode VI at step S238. However, if the coolant return temperature Tw is less than 90° C., then, a further decision is made at step S239 as to whether the coolant return temperature Tw is higher than 35° C. According to the decision, a control is conducted in the control mode II at step S236 if the coolant return temperature Tw is higher than 35° C. or in the control mode IV at step S240 if less than 35° C.

Subsequent to a control in any control modes I–VII, after setting the flag F1 to "1" at step S242 if the rotational speed Ne is judged to be less the second specific rotational speed Ne2 at step S241 or directly if it is judged to be higher than the second specific rotational speed Ne2, the sequence returns.

As described above, the hydrogen gas supply system for hydrogen engines of the present invention is provided with hydrogen storage alloy tanks which releases hydrogen at a specific pressure required for operation of the hydrogen engine and within a specific temperature range close to the ambient temperature; circulation lines which circulate engine coolant to the hydrogen storage alloy tanks; heat medium bypass lines which divert coolant circulating back to the engine side from the hydrogen storage alloy tanks through the circulation lines and divert it to the intake sides of the hydrogen storage alloy tanks; and a means of temperature regulation whereby, when the temperature of coolant supplied to the hydrogen storage alloy tanks from the engine side during passage through the circulation lines exceeds the above-described temperature range, a bypass flow passing through a heat medium bypass line is mixed with coolant from the engine side and directed into the hydrogen storage alloy tanks, thereby maintaining the temperature of entering coolant within the above-described temperature range. Thus, since it is possible to supply hydrogen gas to the hydrogen engine from startup to drive by providing only one type of hydrogen storage alloy tank, startup efficiency is higher and greater fuel efficiency is possible than in the conventional configuration in which two different types of hydrogen storage alloy tanks are provided, one for startup and the other for drive, and drive is begun after warming subsequent to startup. Moreover, further effects are achieved in that since the use of high-pressure containers for the hydrogen storage alloy tanks is not required, weight reduction and simplification of the configuration as whole are possible.

A directional control line is provided in the above-mentioned circulation lines so that when the above-described hydrogen engine side circulation loop is altered by the action of the thermostat in the engine side circulation loop cooling the engine, circulating coolant through the heat exchanger provided to lower the temperature of overheated coolant, a switch is made, sending coolant having already passed through the above-mentioned heat exchanger to the hydrogen storage alloy tanks, and not coolant that has yet to pass through the heat exchanger. Thus, since overheated coolant from the engine side is not supplied to the hydrogen storage alloy tanks, even though the adjustment range of the mixture ratio of coolant supplied from the engine side to bypass coolant is not substantially large, fluctuation in the temperature of coolant entering the hydrogen storage alloy tanks can be kept small. As a result, since the temperature of entering coolant can be reliably maintained within a specified temperature range, the release of hydrogen can be maintained under more stable conditions.

It is to be understood that although the present invention has been described with respect to preferred embodiments thereof, various other embodiments and variants may occur to those skilled in the art. Any such other embodiments and variants which fall within the scope and spirit of the invention are intended to be covered by the following claims.

What is claimed is:

1. A hydrogen gas supply system, having a tank which contains a hydride storage alloy and in which hydrogen at a specific pressure is released within a specified range of temperatures and supplied to a internal combustion hydrogen engine, said hydrogen gas supply system comprising:
   a looped coolant circulation system, in which said engine and said tank are connected in parallel, for circulating a coolant through said engine and said tank; and
   temperature regulation means, positioned in said looped coolant circulation system in parallel with both said engine and tank, for forcing said coolant returning from said tank to mix with said coolant delivered from said engine when said coolant from said engine is at above said specified range of temperatures so as to regulate the temperature of said coolant circulating said tank.

2. A hydrogen gas supply system as defined in claim 1, wherein said temperature regulation means comprises a bypass line positioned in said looped coolant circulation system so as to allow said coolant returning from said tank to bypass said engine and enter said coolant delivered from said engine.

3. A hydrogen gas supply system as defined in claim 2, wherein said temperature regulation means further comprises a pump which is actuated when said coolant from said engine is at above said specified range of temperatures.

4. A hydrogen gas supply system as defined in claim 3, wherein said pump is kept actuated longer with an increase in temperature of said coolant.

5. A hydrogen gas supply system as defined in claim 2, wherein said temperature regulation means further comprises a regulation valve which is opened when said coolant from said engine is at above said specified range of temperatures.

6. A hydrogen gas supply system as defined in claim 5, wherein said regulation valve is intermittently controlled such that the greater a temperature of said coolant from said engine is, the longer the period of said regulation valve remains open.

7. A hydrogen gas supply system as defined in claim 2, and further comprising heat exchange means, positioned in said looped coolant circulation system and in parallel with both of said engine and tank, through which said coolant circulating through said engine flows when the temperature of said coolant exceeds a predetermined temperature, for cooling said coolant from said engine by transfer of heat to the atmospheric air.

8. A hydrogen gas supply system as defined in claim 7, wherein said heat exchange means comprises a heat exchanger and a thermostat which actuates when the temperature of said coolant exceeds said predetermined temperature to direct said coolant to said heat exchanger.

9. A hydrogen gas supply system as defined in claim 8, wherein said heat exchanger comprises a radiator.

10. A hydrogen gas supply system as defined in claim 7, wherein said looped coolant circulation system comprises directional control means for directing said coolant from said heat exchange means to said tank in place of said coolant from said engine.

11. A hydrogen gas supply system as defined in claim 1, further comprising electrical heating means for heating said tank when a pressure at which hydrogen is released from said tank is lower than said specific pressure.

12. A hydrogen gas supply system as defined in claim 11, wherein said looped coolant circulation system circulates a coolant through said tank bypassing said engine while said electrical heating means is heating said tank.

* * * * *